(12) United States Patent
Nakano (10) Patent No.: US 8,185,531 B2
(45) Date of Patent: May 22, 2012

(54) METHOD AND APPARATUS FOR PARTITIONING HIGH-DIMENSION VECTORS FOR USE IN A MASSIVE INDEX TREE

(75) Inventor: Russell Toshio Nakano, Sunnyvale, CA (US)

(73) Assignee: Nahava Inc., Sunnyvale, CA (US)

( * ) Notice: Subject to any disclaimer, the term of this patent is extended or adjusted under 35 U.S.C. 154(b) by 398 days.

(21) Appl. No.: 12/507,271

(22) Filed: Jul. 22, 2009

(65) Prior Publication Data

US 2010/0057804 A1    Mar. 4, 2010

Related U.S. Application Data

(60) Provisional application No. 61/083,404, filed on Jul. 24, 2008.

(51) Int. Cl.
*G06F 7/00* (2006.01)
*G06F 17/30* (2006.01)

(52) U.S. Cl. ............ 707/737; 707/756; 707/802
(58) Field of Classification Search ............ None
See application file for complete search history.

(56) References Cited

U.S. PATENT DOCUMENTS

| 6,084,595 A * | 7/2000 | Bach et al. ............ 345/589 |
| 6,381,605 B1 * | 4/2002 | Kothuri et al. ............ 1/1 |
| 7,251,637 B1 * | 7/2007 | Caid et al. ............ 706/15 |

* cited by examiner

*Primary Examiner* — Pierre Vital
*Assistant Examiner* — Loan T Nguyen
(74) *Attorney, Agent, or Firm* — Heimlich Law, PC; Alan Heimlich, Esq.

(57) ABSTRACT

A method and apparatus for partitioning high-dimension vectors for use in a massive index have been disclosed. Using an initial guess on a collection of vectors, the vectors are examined. If the collection is not empty then dividing the collection until a collection contains a single vector or contains two vectors then transforming the two vectors into a majorize result and transforming the result into a graphical representation for a user.

1 Claim, 6 Drawing Sheets

Fig. 3 Balanced binary tree

METHOD AND APPARATUS FOR PARTITIONING HIGH-DIMENSION VECTORS FOR USE IN A MASSIVE INDEX TREE

RELATED APPLICATION

This patent application claims priority of U.S. Provisional Application Ser. No. 61/083,404 filed Jul. 24, 2008 titled "Method And Apparatus For Partitioning High-Dimension Vectors For Use In A Massive Index Tree", which is hereby incorporated herein by reference.

FIELD OF THE INVENTION

The present invention pertains to datasets. More particularly, the present invention relates to a method and apparatus for partitioning high-dimension vectors for use in a massive index tree.

BACKGROUND OF THE INVENTION

High-dimension vectors arise when computing similarity of items that cannot be conveniently represented by a total ordering, such as numbers or alphabetic strings. This presents a problem. For example, in one approach the similarity of images can be computed using "signatures" derived from high-dimension vectors obtained from spectral techniques such as FFT and DCT [Celentano 1997 (@inproceedings{celentano97fftbased, author="Augusto Celentano and Vincenzo Di Lecce", title="{FFT}-Based Technique for Image-Signature Generation", booktitle="Storage and Retrieval for Image and Video Databases ({SPIE})", pages="457-466", year="1997", url="citeseer.ist.psu.edu/597114.html"})]. Matches between short sections of music (frames) within a song or piece can be computed by the Mel-frequency cepstral coefficients (MFCC) [Logan 2001 (@misc{logan01contentbased, author="B. Logan and A. Salomon", title="A content-based music similarity function", text="B. Logan and A. Salomon. A content-based music similarity function. Technical report, Compaq Cambridge Research Laboratory, June 2001.", year="2001", url="citeseer.ist.psu.edu/logan01contentbased.html"})], which are derived from a discrete-cosine transformation (DCT). Similarity between chromosomes stored in a genomic databank can be computed by representing the nucleotide sequences as sparse vectors of high dimension derived from a Markov transition model [Nakano 2004 (Russell Nakano, "Method and apparatus for fundamental operations on token sequences: computing similarity, extracting term values, and searching efficiently", U.S. Patent Application, 20040162827, Aug. 19, 2004.)].

BRIEF DESCRIPTION OF THE DRAWINGS

The invention is illustrated by way of example and not limitation in the figures of the accompanying drawings in which.

DETAILED DESCRIPTION

Russell Nakano, "Method and apparatus for fundamental operations on token sequences: computing similarity, extracting term values, and searching efficiently", U.S. Patent Application, 20040162827, Aug. 19, 2004, is hereby incorporated herein in its entirety. Herein referred to as Nakano 2004.

Russell Nakano, "Method and apparatus for efficient indexed storage for unstructured content", U.S. Patent Application, 20060190465, Aug. 24, 2006, is hereby incorporated herein in its entirety. Herein referred to as Nakano 2006.

Balanced, tree-organized data structures, also known as index trees, are useful in computer implementations because they are relatively straightforward to build, and provide fast lookup. In particular, we focus our attention on balanced binary trees that are used in efficient storage and lookup of massive quantities of high-dimension items, such as in [Nakano 2006 (Russell Nakano, "Method and apparatus for efficient indexed storage for unstructured content," U.S. Patent Application, 20060190465, Aug. 24, 2006)]. In that disclosure, all content items are represented as vectors in a high-dimension inner product space.

Figure 3:
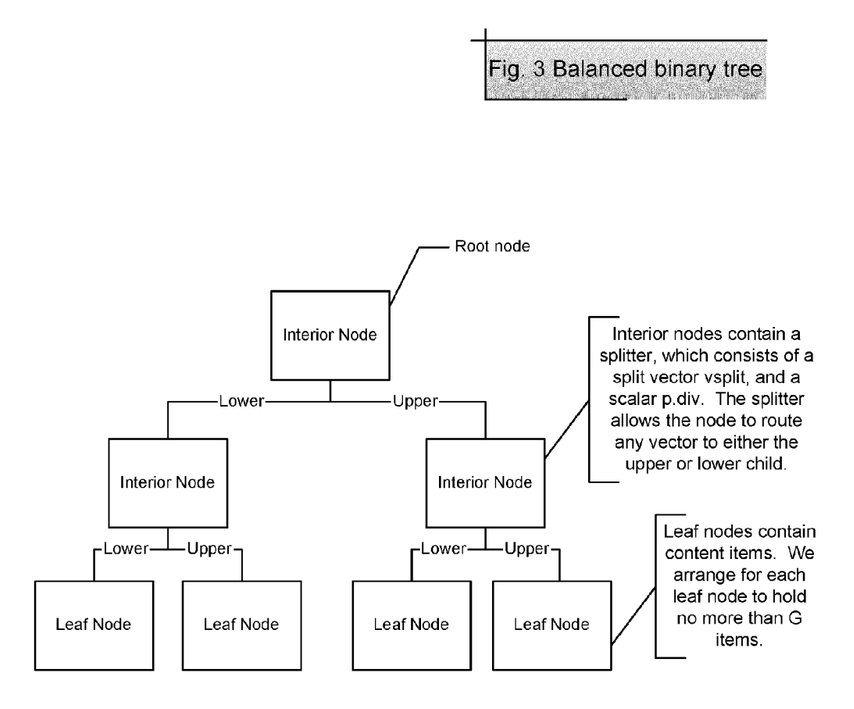
FIG. 3 illustrates one embodiment of the invention showing nomenclature for a balanced binary tree.

Notation $<x, y>$ means the inner product of vectors x and y $v.i$ means the i-th vector $v.i$ of a collection $sum(i=1, \ldots, m; v.i)$ means the summation of the vector $v.i$ over the subscript values 1 through m Introduction We use a balanced binary tree, because we want to build an index based on similarity of a large number of items. Refer to FIG. 3. A tree has a single root node. Each node is either an interior node or a leaf node. A leaf node contains distinct items, and we arrange for each leaf node to contain no more than a predetermined number of items G. (G is typically chosen to be a small value such as 8, because the operation count at the leaf node grows as $G^2$, and we want to keep a bound on the operation count at the leaves.) An interior node has a lower child node and a upper child node, where the children are either both interior nodes, or both leaf nodes. (Although it is more conventional to refer to the child nodes as the left child and the right child, the reason for naming them "lower" and "upper" will become apparent shortly.) See [Wikipedia Binary_tree 2008 ("Binary tree," http://en.wikipedia.org/wiki/Binary_search_trees, Jul. 23, 2008)].

We use a hierarchical decomposition where each node partitions all the items assigned to it to either the lower or upper child. This procedure starts from the root node, which is assigned all N items in the collection. Using a splitting procedure, the lower and upper child nodes are assigned N/2 items, recursively, until we have fewer than K items.

A critical ingredient in our recipe for a balanced binary tree is the splitting procedure, where the inputs and outputs are specified below.

Splitting Procedure

Input:

a collection C of distinct, non-zero vectors $v.i$ from an inner product space S.

Outputs:
 a) a vector v.split, called the "split vector."
 b) a scalar value p.div, called the "split value."
 c) an output collection of vectors e.i=v.i−(<v.i,v.split>/<v.split,v.split>)*v.split.
 d) a subset L of collection C, where e.i being a member of L implies that for its corresponding vector v.i, <v.i, v.split>^2<=p.div, called the "lower set."
 e) a subset U of collection C, where e.i being a member of U implies that for its corresponding vector v.i, <v.i, v.split>^2>p.div, called the "upper set."

The splitting procedure will be invoked to assign the lower set to the lower child node, and to assign the upper set to the upper child node (see for example FIG. 3). For example, suppose we have a million vectors. The root node will apply the splitting procedure to split the vectors in to the lower and upper sets. If it produces an acceptable partitioning, defined shortly, the resulting half million vectors of the lower set will be assigned to the lower child, and the remaining half million vectors of the upper set will be assigned to the upper child. Recursively applying this procedure produces a balanced binary tree.

The splitting procedure needs to produce an acceptable partition of the input collection, defined as follows. We define q as the fraction of the input vectors that are assigned to the lower set L. Ideally we want exactly half of the input vectors to be assigned to the lower set, and the other half assigned to the upper set. In practice, we say that the splitting procedure produces an acceptable result if q is within the range [0.5−r, 0.5+r], for some chosen r in [0, 0.5]. For example, suppose we set r=0.2. Accordingly, we deem any partition that produces at least 30% of the input collection in the lower set, up to 70% of the input in the lower set, to be an acceptable partition.

We make three observations.

First, compared to the earlier formulation of [Nakano 2006] we use the square of the inner product, <v.i, v.split>^2, instead of the inner product alone. The current formulation has the desirable property that it disregards the sign of the inner product when it groups together vectors v.i that are strongly aligned with the split vector v.split. For example, we may have sampled music waveforms converted into vectors that are composed of frequency components through a DCT computation. Two samples with similar frequency components but which are merely out-of-phase will have opposite signs of the dot product, but for most purposes want to be grouped together. Squaring the inner product is an optional step that achieves this effect.

Second, the output vectors e.i are the input vectors v.i, except that the contribution of the split vector has been subtracted off. The output vectors e.i are subsequently used as the inputs to the child nodes in the tree. This has the appealing property that in the process of building the tree, we are successively computing an eigenvector-based basis for the original input collection of vectors. Therefore as we progress deeper into the tree, the "residual" output vectors move closer in magnitude to zero. The output vectors are the error values in the basis decomposition.

Third, we observe that according to the procedure described here the lower and upper child nodes will compute eigenvectors on the lower and upper collections of output vectors. When the lower and upper eigenvectors wind up being sufficiently dissimilar, it is indeed advantageous to introduce child nodes. But when the lower and upper eigenvectors v.lower and v.upper are sufficiently similar, say S=<v.lower, v.upper>^2/(<v.lower,v.lower>*<v.upper, v.upper>)>S.threshold, then we obtain a more efficient basis if we suppress the introduction of lower and upper child nodes, and simply introduce a single child node instead. For instance, we have found that a value of S.threshold=0.7 gives good results.

In [Nakano 2006] the split vector and split value are defined as:
 a. the split vector v.split is the centroid of the vectors contained in C, $$v.split = (1/m)*sum(i=1,\ldots,m;v.i) \quad (1)$$

b. compute the deviation values, $$d.i = <v.i, v.split>. \quad (2)$$

c. the scalar split value p.div is the median of the deviation values squared.

Because the splitting procedure must be executed repeatedly in a computer implementation of the techniques presented here, small flaws become magnified. One failure mode is that the split vector winds up being zero or very close to zero. When that happens the resulting partition fails the acceptable condition, and therefore we desire a splitting procedure that never produces a zero split vector. In this light we see that computing the centroid as in [Nakano 2006] may be problematic when the centroid located at or near the origin in the vector space. When the split vector is zero, this ruins all the subsequent calculations because the deviations values d.i become zero, and achieving an acceptable split becomes impossible.

The difficulty that accompanies a zero split vector can be understood by recasting the splitting procedure as follows. Arrange the vectors v.i as m columns in a matrix A, $$A = [v.i, \ldots, v.m]$$

Introducing the unit m-vector u=(1/sqrt(m))*(1, ..., 1), we see that in eqn. (1), d.i can be written $$d.i = sqrt(m)*x.i.\text{transpose}*A*u, \quad (3)$$

for i=1, . . . , m
Stack the m expressions from (3) into a single matrix expression, and combine the scaling constant sqrt(M) into the vector d.

$$\text{Let } d=(1/sqrt(M))*(d.1, \ldots, d.M). \quad (4)$$

Therefore, $$d = A.\text{transpose}*A*u \quad (5)$$

The expression above can be interpreted as the initial step of the Power Method for finding the principal eigenvalue and principal eigenvector (sometimes referred to as the dominant eigenvector) of the symmetric matrix A.transpose*A. See [Golub 1983 (Gene Golub and Charles Van Loan, Matrix Computations, The Johns Hopkins University Press, Third ed., Baltimore, 1983, pp. 330-2.)]. The structure becomes clearer if we write the sequence of eigenvector estimates as u.k, starting from the initial guess u.0=(1/sqrt(m))*(1, ..., 1), where lambda.k is the principal eigenvalue.

$$d.k = A.\text{transpose}*A*u.k-1 \quad (6)$$

$$u.k = d.k/sqrt(<d.k,d.k>) \quad (7)$$

$$lambda.k = u.k.\text{transose}*A.\text{transpose}*A*u.k \quad (8)$$

for k=1, 2, 3, until convergence.

With the additional perspective provided by this formulation, we observe that the problem of the split vector becoming zero does not mean that the technique is fundamentally flawed, but merely that the initial choice of u.0 happened to be in the nullspace of A. In other words, because of the unlucky choice of u.0, the product A*u.0 maps to zero, and ruins the computation. This analysis gives us a roadmap to an iterative procedure that eventually leads to the principal eigenvector. Furthermore it tells us that aside from unfortunate choices of initial starting conditions, any other reasonable choice converges (at some rate) to the same destination. It also tells us that we can decide how close we get to the principal eigenvector by deciding how many iterations to perform. This is handy strategic information because we can trade more iterations which means more compute cycles and lower performance, for better quality of split values. We are neither trapped in an expensive algorithm to compute eigenvectors precisely, nor to even compute more than just one that we need.

In the previously described technique of [Nakano 2006], the split vector is essentially a first approximation of the principal eigenvector, which puts the technique on a firm theoretical foundation.

Having the procedure yield the principal eigenvector u in the limit is a hugely useful property. We can run the procedure to any desired closeness to convergence. The split values are components of the principal eigenvector, u. The components of u play the role of picking out from the matrix A the dominant features of the collection of vectors. Put another way, the product A*u is vector that can be considered to be the single-best representation of the essential character of the ensemble denoted by A. This highlights why the splitting procedure works well.

Armed with this knowledge, we describe an improved technique for picking the initial guess for the principal eigenvector, u.0, that guarantees that the first split vector out of the approximation won't be zero.

In practice we have found that the one-sided Jacobi rotation, also known as Hestenes transformation [Strumpen 2003 (8. @misc{strumpen-stream, author="Volker Strumpen and Henry Hoffmann and Anant Agarwal", title="A Stream Algorithm for the SVD", date="Oct. 22, 2003" id="MIT-LCS-TM-641" url="citeseer.ist.psu.edu/strumpen03stream.html"})], is very effective at helping us compute a reasonable initial guess, Suppose that we have two vectors x and y. The one-sided Jacobi rotation produces two vectors u and v defined as:

$$u=c*x-s*y$$

$$v=s*x+c*y$$

where $$g=<x,y>$$

$$a=<x,x>$$

$$b=<y,y>$$

$$w=(b-a)/(2*g)$$

$$t=sign(q)/(abs(q)+sqrt(1+w^2))$$

$$c=1/sqrt(t^2+1)$$

$$s=c*t$$

Next, we define a helper function that takes two vectors and maps it to a result vector.

majorize(x, y)=
1. Perform a one-sided Jacobi rotation on x, y to compute u, v, as described above.
2. if (((b−a)*((s*s)−(c*c)))−4*c*s*g>0) then return u. (This logical condition is true when <u, u> is greater than <v, v>.)
3. otherwise return v.

We use the Jacobi rotation on pairs of vectors to successively combine their values until we have split vector that represents the entire set.

```
initialGuess(collection of vectors S) =
    if (S is empty) then return null
    else if (S contains one vector) then return the sole member of S
    else if (S contains two vectors) then return majorize(first vector of S,
    second vector of S)
        otherwise return majorize(
            initialGuess(half of members of S),
            initialGuess(other half of members of S))
```

We see that if a collection of vectors S contains at least one non-zero vector, then initialGuess(S) is not zero. The proof goes as follows. If S is a singleton non-zero vector, then initialGuess(S) returns that non-zero singleton. If S is a pair of vectors, and at least one of them is non-zero, then because a) the Jacobi operation performs a rotation through an angle defined by the cosine-sine pair (c, s), and b) the conclusion of Jacobi selects the larger of the transformed vectors u and v, then a non-zero vector is returned. Finally, in the recursive case, suppose to the contrary that a zero vector was returned. In that case, it would have been returned by majorize, which would imply that both arguments were zero. This implies that all the other argument pairs of majorize are zero as well, in addition to any one-member collection cases. This implies that all the vectors in the collection are zero, which is a contradiction. This says that the initialGuess function returns a non-zero vector whenever the input collection contains at least one non-zero vector.

To summarize, we use following the procedure:
Procedure: splitVector
1. We are given a collection S of m distinct, non-zero vectors, v.i.
2. Invoke initialGuess(S) on the collection S. Let u.0 be the result.
3. Define matrix A=[v1, . . . , v.m], where column i is the i-th vector from S.
4. Initialize k=0.
5. Compute the split values vector d=A.transpose*A*u.k.
6. Check if the split values d give us an acceptable partitioning of the vectors v.i.
7. If yes, then we are done.
8. Otherwise, compute u.k+1=d/sqrt(<d, d>).
9. Increment k<−k+1.
10. Go to step 6.

Please note that k (e.g. at 6. and 9.) is an iteration count.
We have thus shown that:
1. We have a way to compute an initial guess for the split vector (See splitVector procedure).
2. We have a way to successively improve split values and split vector.
3. We have a way to successively improve the partition of a collection of distinct, non-zero vectors into a lower set and an upper set.

Figure 4:
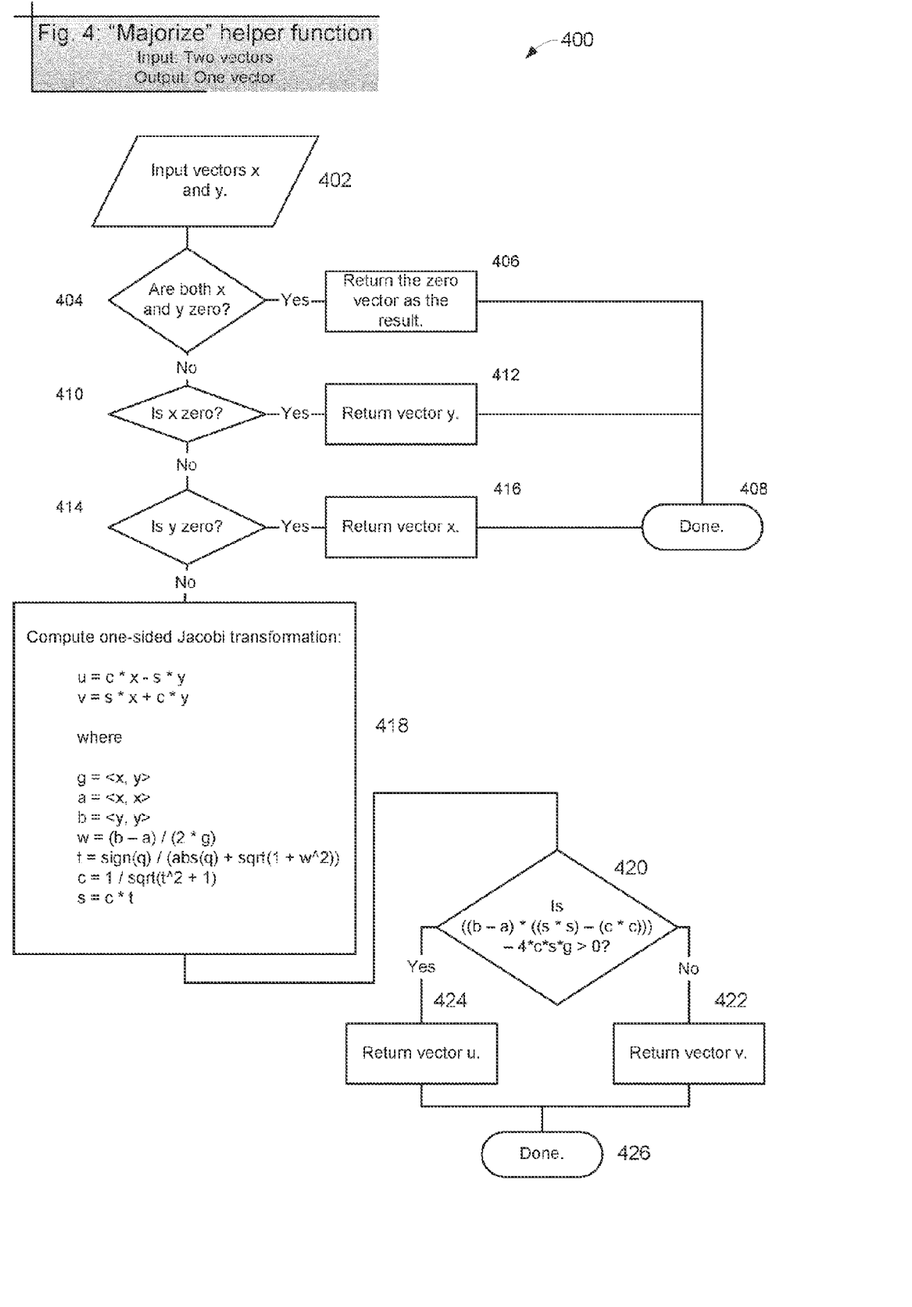
FIG. 4 illustrates one embodiment of a "majorize" helper function having an input of two vectors and an output of one vector.

FIG. 4 illustrates, generally at 400, one embodiment of a "majorize" helper function having an input of two vectors and an output of one vector. At 402 Input vectors x and y. At 404 determine: Are both x and y zero? If at 404 the result is Yes then proceed to 406 Return the zero vector as the result, and then proceed to 408 Done. If at 404 the result is No then proceed to 410. At 410 determine: Is x zero? If at 410 the result is Yes then proceed to 412 Return vector y. and then proceed to 408 Done. If at 410 the result is No then proceed to 414. At 414 determine: Is y zero? If at 414 the result is Yes then proceed to 416 Return vector x. and then proceed to 408 Done. If at 414 the result is No then proceed to 418. At 418 Compute one-sided Jacobi transformation:

$$u=c*x-s*y$$

$$v=s*x+c*y$$

where $$g=<x,y>$$

$$a=<x,x>$$

$$b=<y,y>$$

$$w=(b-a)/(2*g)$$

$$t=\mathrm{sign}(q)/(abs(q)+sqrt(1+w^2))$$

$$c=1/sqrt(t^2+1)$$

$$s=c*t$$

then proceed to 420. At 420 determine: Is $((b-a)*((s*s)-(c*c)))-4*c*s*g>0$? If at 420 the result is Yes then proceed to 424 Return vector u. and then proceed to 426 Done. If at 420 the result is No then proceed to 422 Return vector v. and then proceed to 426 Done.

Figure 5:
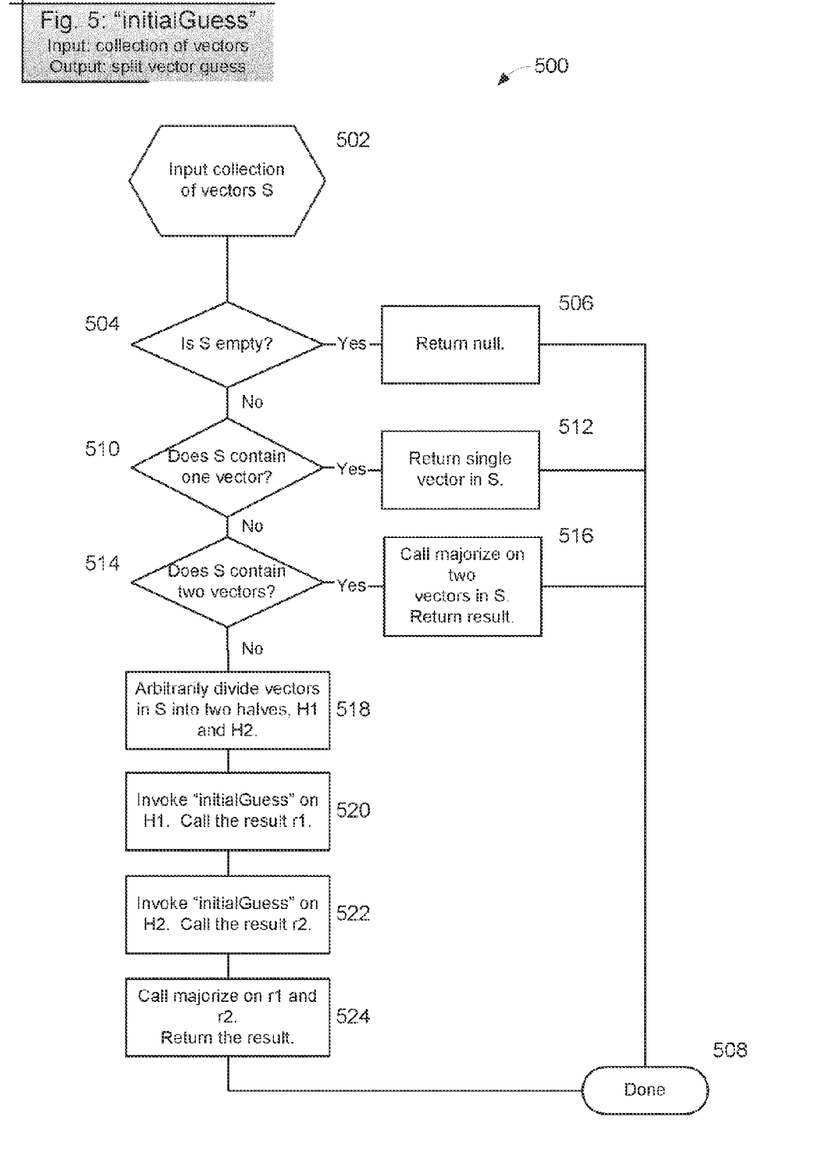
FIG. 5 illustrates one embodiment of a "initialGuess" approach showing an input as a collection of vectors and an output as a split vector guess.

FIG. 5 illustrates, generally at 500, one embodiment of an "initialGuess" approach showing an input as a collection of vectors and an output as a split vector guess. At 502 Input collection of vectors S. At 504 determine: Is S empty? If at 504 the result is Yes then proceed to 506 Return null., and then proceed to 508 Done. If at 504 the result is No then proceed to 510. At 510 determine: Does S contain one vector? If at 510 the result is Yes then proceed to 512 Return single vector in S. and then proceed to 508 Done. If at 510 the result is No then proceed to 514. At 514 determine: Does S contain two vectors? If at 514 the result is Yes then proceed to 516 Call majorize (e.g. as illustrated in FIG. 4) on two vectors in S and Return result. and then proceed to 508 Done. If at 514 the result is No then proceed to 518. At 518 Arbitrarily divide vectors in S into two halves, H1 and H2. At 520 Invoke "initialGuess" on H1 and Call the result r1. At 522 Invoke "initialGuess" on H2 and Call the result r2. (For example, at 520 and 522 recursively or iteratively invoke another "initialGuess" as illustrated in FIG. 5 using the input collection of H1 and H2 yielding results r1 and r2 respectively eventually (i.e. multiple invocations of "initialGuess" may be needed).) At 524 Call majorize (e.g. as illustrated in FIG. 4) on r1 and r2. Return the result and then proceed to 508 Done.

Figure 6:
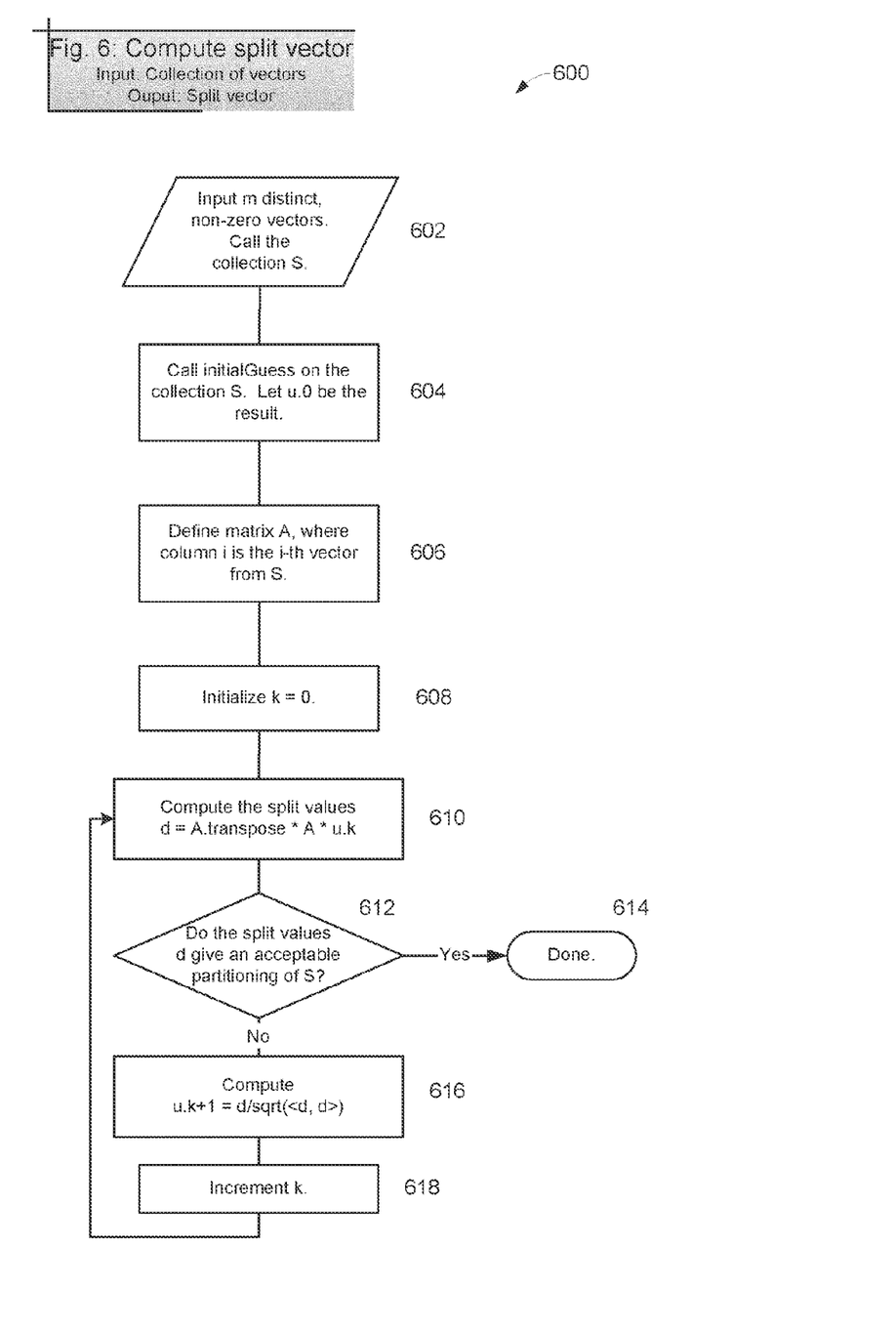
FIG. 6 illustrates one embodiment of a compute split vector approach having an input of vectors and an output of a split vector.

FIG. 6 illustrates, generally at 600, one embodiment of a compute split vector approach having an input of vectors and an output of a split vector. At 602 Input m distinct, non-zero vectors. Call the collection S. At 604 Call initialGuess (e.g., initialGuess as illustrated in FIG. 5) on the collection S. Let u.0 be the result. At 606 Define matrix A, where column i is the i-th vector from S. At 608 Initialize k=0. At 610 Compute the split values d=A.transpose*A*u.k. At 612 determine: Do the split values d give an acceptable partitioning of S? If at 612 the result is Yes then proceed to 614 Done. If at 612 the result is No then proceed to 616. At 616 Compute u.k+1=d/sqrt(<d, d>). At 618 Increment k. Then proceed to 610. Please note that k (e.g. at 608. and 618) is an iteration count.

In FIG. 4 at 426 Done, and FIG. 5 at 508 Done, and FIG. 6 at 614 Done represent a returned value. Such a value can be stored in hardware on a computer and transformed into a graphical representation that can be displayed to a user of the computer. For example, in one embodiment, the returned value may be stored as a group of physical electrons on a trapped gate of a flash memory device. These physical electrons may then be transformed into a graphical representation, for example, by twisting the molecules of a liquid crystal display so that a carrier signal can be modulated and produces on reception a molecular change in a rod and cone receptor of a human user to produce physical electrons thus producing a tangible useful result and transformation tied to a particular machine such as a computer specifically designed with a 64 bit barrel shift register and a carry look ahead arithmetic logic unit. For example, in one embodiment, the returned value may be stored as a series of holes on a paper tape that may be read by a person by tactile sensation (e.g. output from a KSR-33 Teletype). As disclosed Applicant submits that these results are tied to a particular machine or apparatus and/or transform a particular article into a different state or thing and that such particulars and/or things are non-trivial and as such satisfy Bilski as of the date of this Application. Applicant expressly reserves the right to revise this Application if Bilski is overturned and such revisions based on Bilski being overturned will be without prosecution estoppel.

Thus a method and apparatus for partitioning high-dimension vectors for use in a massive index tree have been described.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Figure 1:
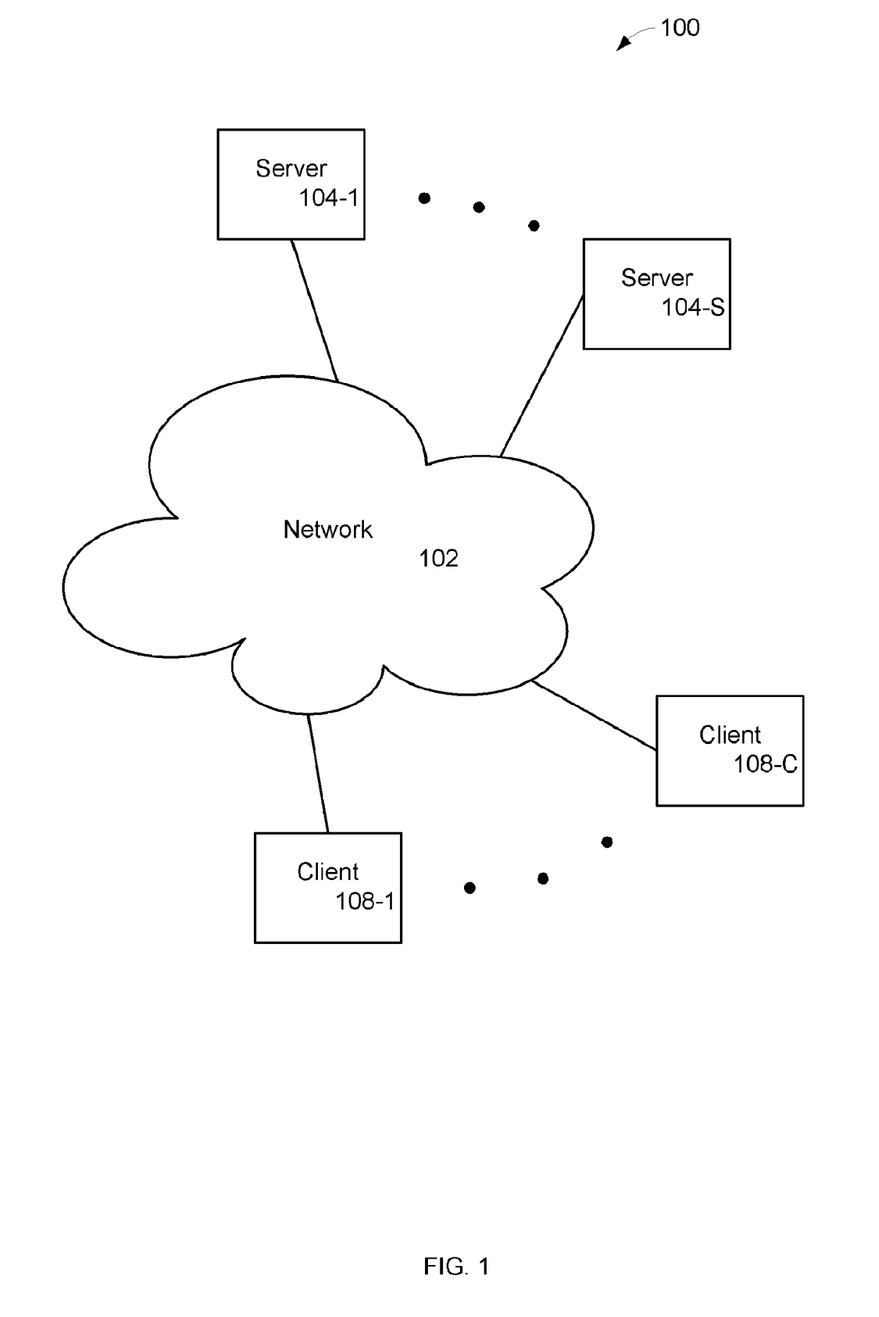
FIG. 1 illustrates a network environment in which the method and apparatus of the invention may be implemented.
Figure 2:
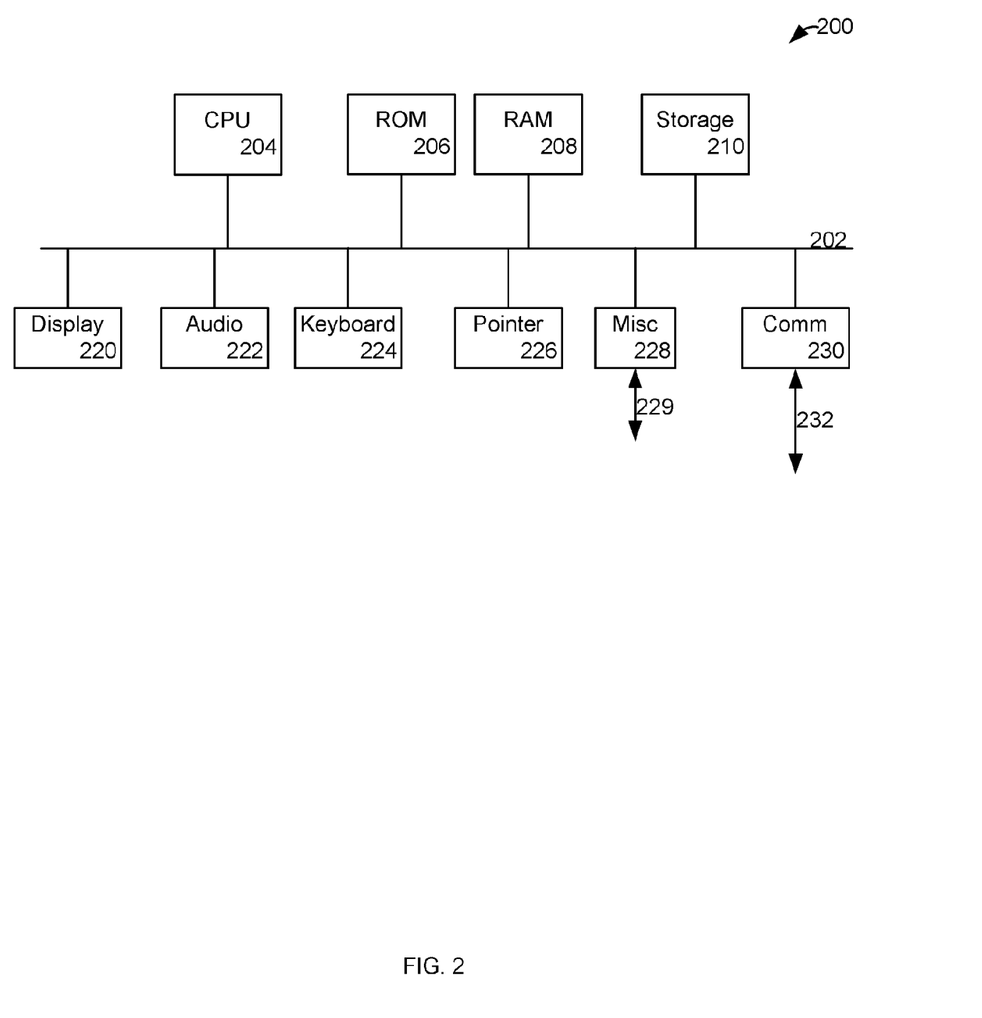
FIG. 2 is a block diagram of a computer system in which may implement some embodiments of the invention and where some embodiments of the invention may be used.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, link 229, communications 230, and communications link 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ) as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for partitioning high-dimension vectors for use in a massive index tree have been described.

What is claimed is:

1. A computer implemented method denoted "initialGuess" comprising:
   (a) inputting a collection of vectors denoted as S;
   (b) determining if said S is empty; and
   (c) if yes then
      (c1) returning a null as a result;
      (c2) storing said result in hardware on said computer;
      (c3) transforming said stored result to a graphical representation; and
      (c4) displaying said graphical representation to a user;
   (d) if no then
   (e) determining if said S contains one vector; and
   (f) if yes then
      (f1) returning said one vector as a result;
      (f2) storing said result in hardware on said computer;
      (f3) transforming said stored result to a graphical representation; and
      (f4) displaying said graphical representation to a user;
   (g) if no then
   (h) determining if said S contains two vectors; and
   (i) if yes then
      (i1) transforming said two vectors into a majorize result;
      (i2) storing said result in hardware on said computer;
      (i3) transforming said stored result to a graphical representation; and
      (i4) displaying said graphical representation to a user;
   (j) if no then
   (k) dividing arbitrarily said vectors in S into two halves, a H1 and a H2;
   (l) invoking another instance of "initialGuess" using said H1 as input vector S and returning a result r1;
   (m) invoking another instance of "initialGuess" using said H2 as input vector S and returning a result r2;
   (n) transforming said result r1 and said result r2 into a majorize result; and
   (o) storing said majorize result in hardware on said computer;
   (p) transforming said stored majorize result to a graphical representation; and
   (q) displaying said graphical representation to a user.

* * * * *